United States Patent

[11] 3,609,547

| | | |
|---|---|---|
| [72] | Inventor | Eugene A. Slusser<br>RFD-1, Concord, N.H. 03301 |
| [21] | Appl. No. | 23,351 |
| [22] | Filed | Mar. 27, 1970 |
| [45] | Patented | Sept. 28, 1971 |

[54] INTEGRATED CIRCUIT TEST SYSTEM
3 Claims, 5 Drawing Figs.

[52] U.S. Cl. .................................................. 324/158 F,
339/45 M
[51] Int. Cl. .................................................. G01r 31/22,
H01r 13/62
[50] Field of Search .......................................... 324/158 F,
158, 73, 73 PC; 339/17, 17 LM, 17 M, 45 M, 176
MP; 317/101, 101 A, 101 B, 101 C, 101 CB, 101
DH

[56] References Cited
UNITED STATES PATENTS
3,271,626  9/1966  Howrilka ...................... 339/45 X FOREIGN PATENTS
809,840  3/1959  Great Britain ................ 317/101

*Primary Examiner*—Rudolph V. Rolinec
*Assistant Examiner*—Ernest F. Karlsen
*Attorney*—David H. Semmes

ABSTRACT: An integrated circuit test system useful for component testing in a temperature chamber or oven under high heat conditions and including a tray having incorporated thereon printed circuit and connectors and two cards, one for mounting devices on sockets for testing and the other having a device load circuitry, each card being connectable with its own printed circuit connector on the tray to permit rapid changes of both test conditions and devices. The cards are easily and rapidly interchangeable for the change of test conditions and devices with the card plug in feature, and levers are provided on the tray for coacting with the printed circuit cards to assist in removal of the cards from the connectors.

INVENTOR
EUGENE A. SLUSSER

BY David H. Semmes
ATTORNEY

INVENTOR
EUGENE A. SLUSSER

BY David H. Semmes
ATTORNEY 3,609,547

INTEGRATED CIRCUIT TEST SYSTEM

BACKGROUND OF THE INVENTION

A need exists in the industry for apparatus to test electric and electronic devices susceptible of permitting frequent changes of device types with a minimum of effort and time required. Such apparatus desirably would permit complete interchangeability and replacement of prefabricated members incorporating devices to be tested and device load circuitry with means to facilitate and implement rapid changes and with the apparatus being readily insertable in a test oven. Heretofore such apparatus has not been available in designs incorporating optimums of practicality, use and simplicity and efficiency of test component and load changes.

SUMMARY OF THE INVENTION

The present invention is for an integrated circuit test system including a tray incorporating printed circuits therein and connectors adapted to receive rapidly connectable and detachable cards having respectively incorporated therein test devices, preferably on sockets, and a device load circuitry, each card having fixed metallization patterns for functioning of the apparatus. The tray includes, preferably, a handle and a sliding surface to mate with insert guides in a test oven to facilitate insertion and removal and cam action levers are provided on the tray to assist in the removal of the printed circuit cards from the tray connectors. The tray is designed for principal use in a semiconductor life test of a Burn-in system. However, a separate device card can be used with other test systems for parameter measurements of the semiconductor devices held on that circuit card which is positioned upon the tray. Such a separate device card "holds" device identity throughout a complete test program.

Additional objects and advantages of the invention will be apparent from the following detailed description of a preferred embodiment thereof when taken together with the accompanying drawings in which.

Referring now more specifically to the drawings, a tray generally designated 10 is constructed for use of two cards, a load board 12 and a device board 14, each being readily attachable to and detachable from the tray as will appear hereinafter.

Figure 5:
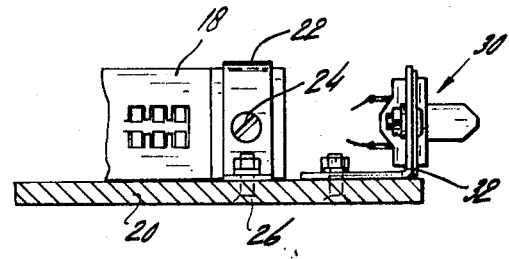
FIg. 5 is a fragmentary sectional view taken on line 5—5 of FIG. 3.

The tray 10 contains, in the embodiment shown, two connectors 16 and 18 having for example 200, 10 pin connectors and the connector assemblies being mounted back-to-back and attached to a subbase 20 comprised of a fiberglass reenforced laminate or the like. The connectors 16 and 18 are mounted on the subbase 20 by brackets 22, screws 24 and nuts and bolts 26, as shown more clearly in FIG. 5. The subbase includes a handle as at 28 and the subbase serves as a sliding surface to mate with insert guides in a test oven (not shown). A connector 30 is mounted at the end of the tray opposite the handle and can consist, as shown in the drawings, of a 16 pin connector, and adapted to mate with a connector in the oven. The connector 30 is mounted on subbase 20 by means of a bracket 32 as operatively shown in FIG. 5. Connector 30 is connected to the back-to-back wired connectors 16, 18 in any known manner such as by wires numbering 14 in the shown apparatus.

Figure 1:
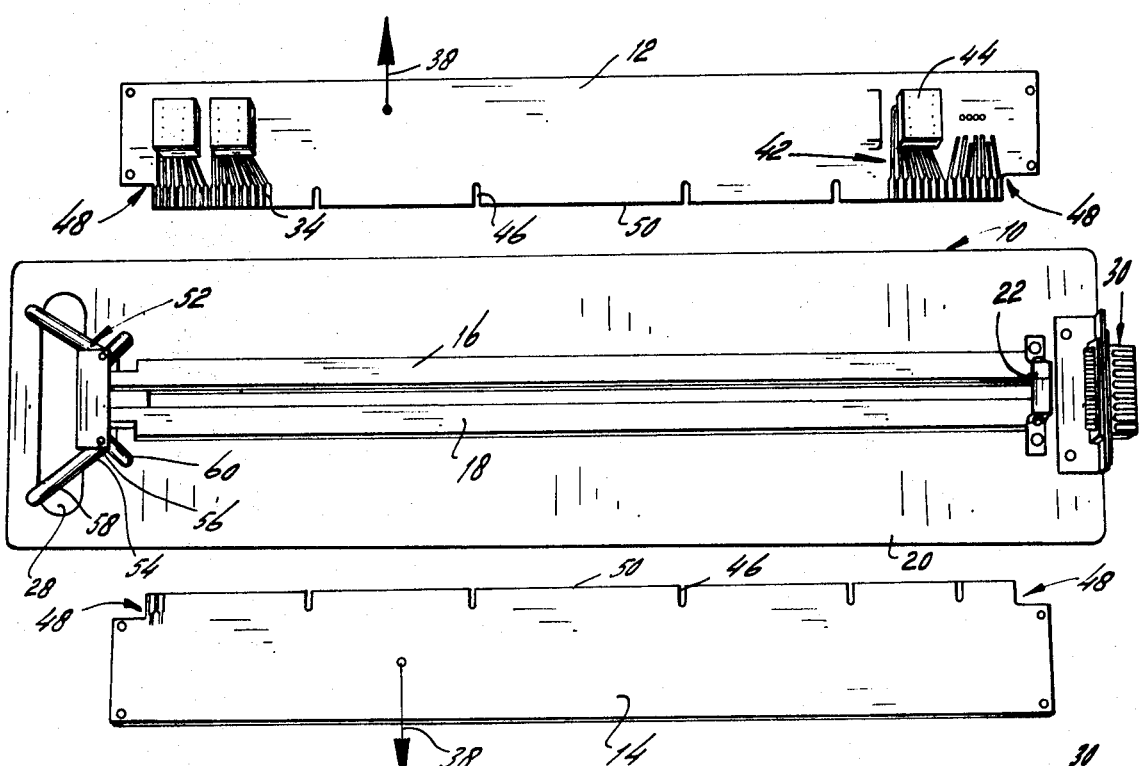
FIG. 1 is an exploded plan view of an integrated circuit test system in accordance with the invention.
Figure 2:
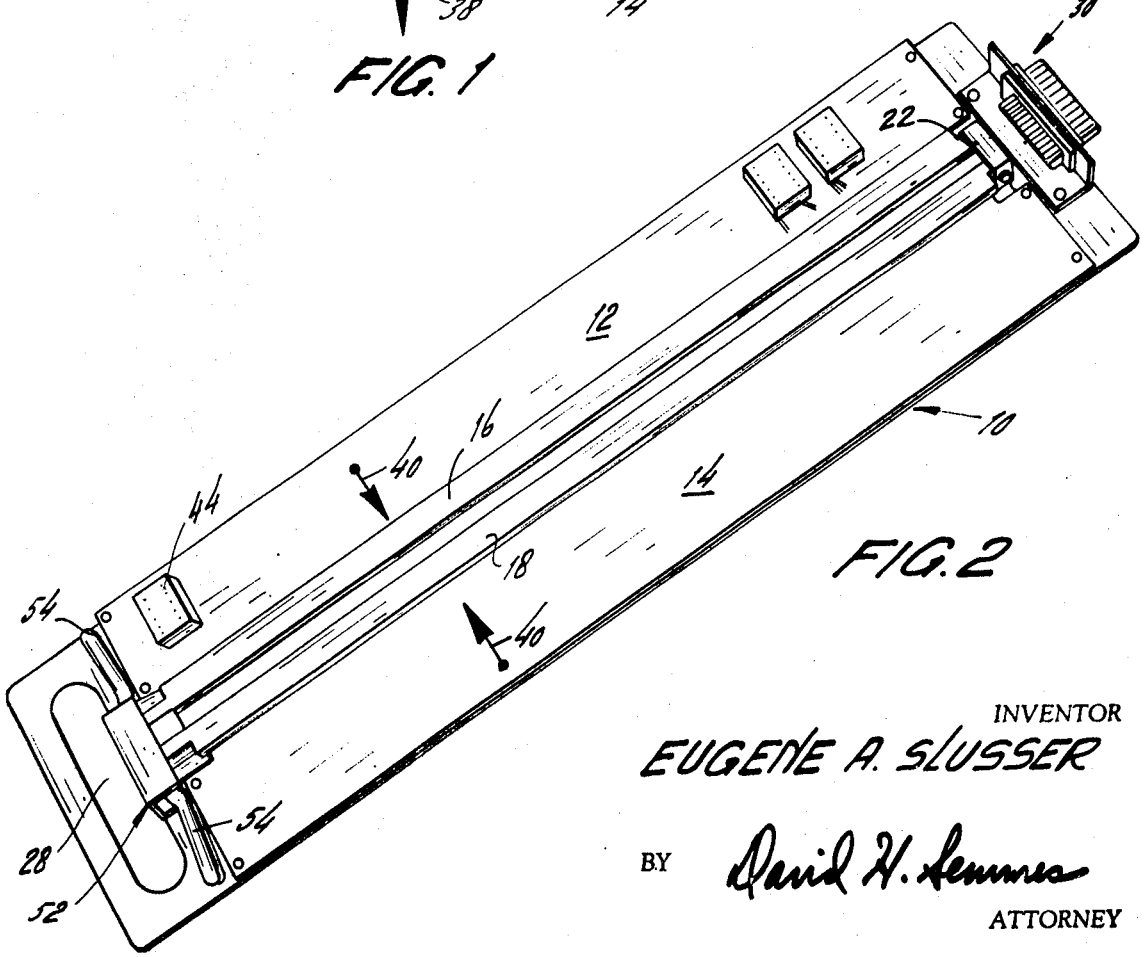
FIG. 2 is an assembled perspective view of the apparatus of FIG. 1 in test ready condition.

Each of the cards 12 and 14 are substantially of a rectangular configuration, as shown, and are of a suitable material having appropriate printed circuits thereon, not shown in detail, connected into and terminating at male connectors 34 positioned along the inner card edge for coaction with female connectors 36 of connectors 16 and 18 to permit ready attachment and detachment of the cards. A disassembled view is shown in FIG. 1 with arrows 38 indicating direction of movement for removal of the cards from the tray. In FIG. 2 an assembled view is shown with arrows 40 indicating direction of movement of the cards for attachment to the tray for subsequent testing operations.

The load card or board 12 can be manufactured in fixed metallization patterns to meet customer requirements as generally indicated at 42 with load devices 44. The load card can of course be varied as desired and also made available in a universal configuration permitting a customer or user to add load circuitry and connections as desired. The device holding card or board can accommodate any desired number of pin devices for example for ring counter applications or any desired universal application with the required leads and connection being incorporated. Details of this aspect of the apparatus are not required for an understanding of the invention, being within the skill of the art, and therefore not shown.

Figure 3:
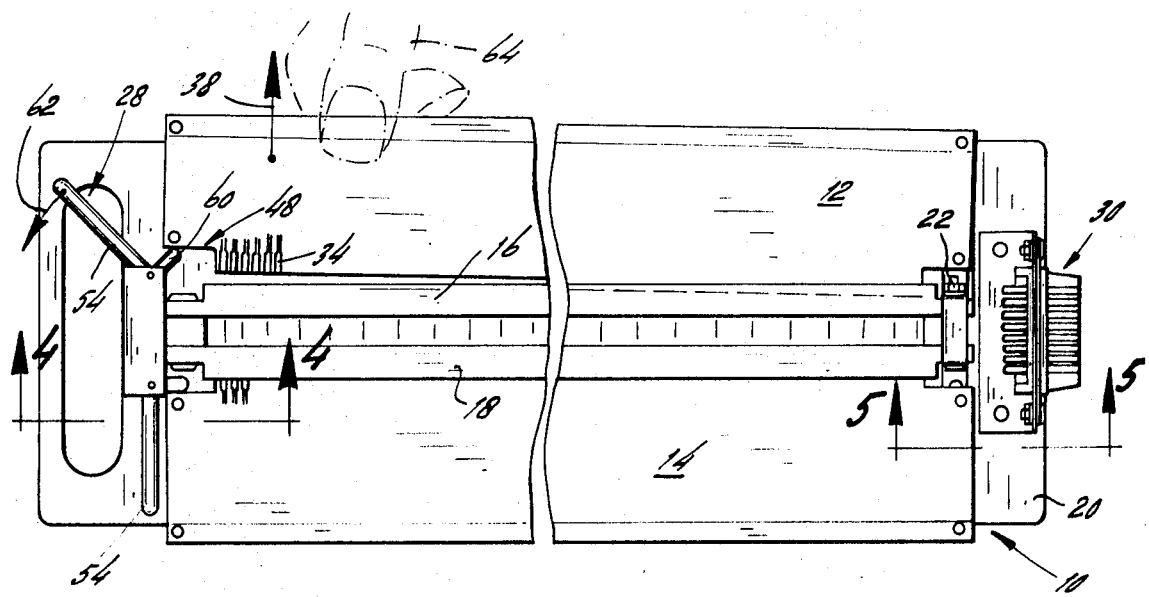
FIG. 3 is a plan view of the apparatus schematically depicting removal of a card from the assembly to permit changes of test devices or conditions.
Figure 4:
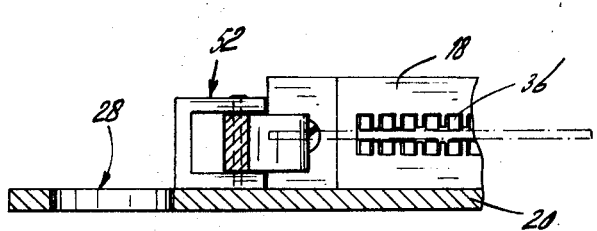
FIG. 4 is a fragmentary sectional view taken on line 4—4 of FIG. 3.

The inner edges of the cards or boards are preferably provided with alignment notches 46 for coacting with aligning fins or the like, not shown, in connectors 16 and 18. Cutouts 48 are provided at the opposite inner ends of the boards or cards which serve to permit insertion of inner edges 50 of the boards having male connectors 34 thereon into the female connectors in connectors 16 and 18 without interference with mounting structure or the like. These cutouts also serve a very important use and function in the invention to facilitate quick and easy removal of the cards or boards from the tray. To this end a board release lever 52 is mounted on the subbase 20 at one end of connectors 16, 18 in an appropriate manner and includes two cam action levers 54 pivotably mounted at 56 having handle portions 58 and board engaging finger portions 60. When the boards or cards are mounted in the assembled position shown in FIG. 2 the fingers 60 are confined in the cutouts 48. Subsequent to selection and testing of a set of devices and when it is desired to change test devices or circuitry and loads the levers 54 are manipulated by engagement with handle portions 58 in a manner to engage fingers 60 against the outer edges of cutouts 48 as shown and indicated by arrow 62 in FIG. 3 to aid release of the board by test personnel as diagrammatically shown with a test personnel's hand 64 in FIG. 3 for removal in the direction of arrow 38. The levers 54 are freely pivotable to permit rapid mounting and insertion of cards or boards and removal therefrom for setting up different test conditions.

Obviously different tray, card and test devices and circuits can be utilized within the teachings of the invention without departing from the spirit and scope thereof as defined in and limited solely by the appended claims.

I claim:

1. An integrated circuit test system comprising:
  A. a tray, including a base and a handle, said handle being in said base and said base constituting a sliding surface for mating engagement with insert guides in a test oven;
  B. a tray connector mounted on said tray;
  C. a circuit board connector mounted on said tray, said circuit board connector being elongate and comprising two connector sets mounted back-to-back and having a plurality of female connectors;
  D. a removable circuit and component board having circuitry thereon and connector at an edge thereof, adapted for operative engagement with said circuit board connector on said tray and said board having a notch therein, said board being elongate and said connector thereon including a plurality of male connectors, said male and female connectors being interengagable to permit assembly and disassembly of a board from said tray, two said circuit boards being mountable on said tray, one said board comprising a load board and the other said board comprising a test device board, said boards including integrated circuits thereon interconnecting load and device components for interconnection with circuitry on said tray through the mating connectors;

E. a movable board release lever on said tray, said lever being pivotably mounted and including a board engaging finger and a handle portion, said finger being confinable in said notch with said board in assembled relation on said tray and said finger being engageable with a side of said notch upon rotation of said lever to effect board lateral disengagement from said tray, said lever being engageable with a portion of said board to permit, upon movement, lateral disengagement of said board connections and said board from said tray.

2. A system as claimed in claim 1 wherein one said board accepts devices on sockets and the other said board accepts device load circuitry, said circuit board connector on said tray being connectable with a printed circuit on each said board and each said board being connectable into its own printed circuit connector for permitting rapid changes of both test conditions and devices and facilitating rapid changes of device types.

3. A system as claimed in claim 1 each said board having a notch therein and two said cam action levers being mounted on said tray for coaction with each said notch for several removement of each said board.